United States Patent

[11] 3,612,099

| [72] | Inventor | Daniel Charles MacManus<br>Owosso, Mich. |
| --- | --- | --- |
| [21] | Appl. No. | 39,793 |
| [22] | Filed | May 22, 1970 |
| [45] | Patented | Oct. 12, 1971 |
| [73] | Assignee | General Motors Corporation<br>Detroit, Mich. |

[54] PRESSURE RELIEF VALVE FOR PRESSURIZED FUEL TANK
1 Claim, 3 Drawing Figs.

| [52] | U.S. Cl. | 137/540,<br>137/454.5 |
| --- | --- | --- |
| [51] | Int. Cl. | F16k 17/04 |
| [50] | Field of Search | 137/516.25,<br>516.27, 516.29, 535, 540, 543.19, 454.5, 798 |

[56] References Cited
UNITED STATES PATENTS

| 3,002,648 | 10/1961 | Rieke | 137/543.19 X |
| --- | --- | --- | --- |
| 3,016,913 | 1/1962 | Bargmann | 137/543.19 X |
| 3,473,626 | 10/1969 | Toda et al. | 137/543.19 X |
| 3,491,786 | 1/1970 | Crossman et al. | 137/543.15 X |
| 3,548,870 | 12/1970 | Morton et al. | 137/540 |

*Primary Examiner*—Laverne D. Geiger
*Assistant Examiner*—David J. Zobkiw
*Attorneys*—J. L. Carpenter and C. K. Veenstra

ABSTRACT: A pressurized fuel tank is disposed transversely over the rear axle of an automobile. A pressure relief valve, discharging from the fuel tank adjacent the vehicle centerline, has a spring-biased valve member carrying an "O"-ring which seats on the valve body; the valve member is raised against the bias of the spring to relieve pressure in the tank.

PATENTED OCT 12 1971

3,612,099

INVENTOR.
Daniel C. MacManus
BY
C. K. Veenstra
ATTORNEY

PRESSURE RELIEF VALVE FOR PRESSURIZED FUEL TANK

This invention provides a valve construction for a pressurized fuel tank which retains the contents of the tank under a predetermined pressure and which relieves any pressure in the tank in excess of the predetermined pressure.

The details as well as other objects and advantages of this invention are discussed below and shown in the drawing wherein.

Figure 1:
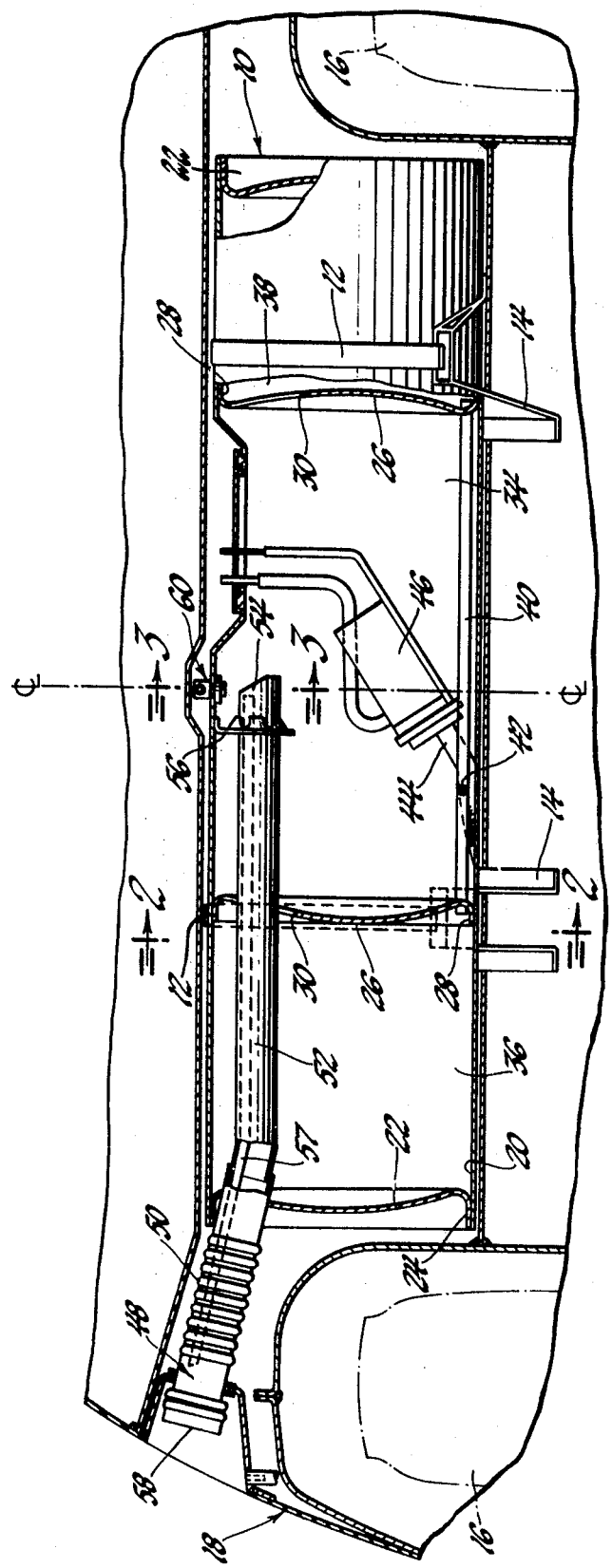
FIG. 1 is a transverse sectional view through a vehicle showing a pressurized fuel tank mounted over the rear axle.

Referring first to FIG. 1, a fuel tank 10 is clamped by bands 12 to supporting brackets 14 between the rear wheels 16 and over the rear axle (not shown) of a vehicle 18.

Tank 10 has a generally cylindrical housing 20 with its longitudinal axis extending transversely of the vehicle centerline. An outwardly convex end cap 22 closes each end of housing 20 and has an outwardly extending peripheral rim 24 secured to housing 20. It will be noted that the end caps 22 are disposed on opposite sides of the centerline of the vehicle and substantially equidistant therefrom.

Figure 2:
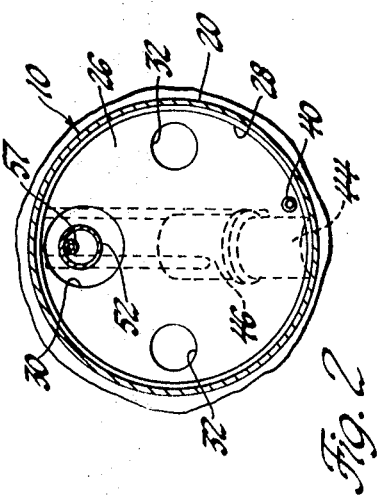
FIG. 2 is a sectional view taken along line 2—2 of FIG. 1 illustrating the construction of the baffles and the location of the pipe in the lower portion of the tank.

A pair of lateral surge controlling baffles 26 disposed on opposite sides of the vehicle centerline and outwardly convex with respect thereto also have outwardly extending peripheral rims 28 secured to housing 20. As best illustrated in FIG. 2, each baffle 26 has a large aperture 30 extending therethrough in the top portion of tank 10 and a pair of smaller apertures 32 extending therethrough near the midportion of tank 10. Henceforth the mid and top portions of tank 10 will be collectively referred to as the upper portion of tank 10.

Apertures 30 and 32 provide free fluid communication between the center compartment 34 and the end compartments 36 and 38 in the upper portion of tank 10. An open ended pipe 40 extends through baffles 26 in the lower portion of tank 10 and has a lateral opening 42 discharging adjacent the inlet sock 44 of an in-tank fuel pump 46 disposed in center compartment 34.

It will be appreciated that a continuous supply of fuel must be disposed adjacent fuel pump inlet sock 44 in all attitudes and during all maneuvers of the vehicle. When tank 10 is full, liquid fuel may freely enter center compartment 34 from end compartments 36 and 38 through baffle apertures 30 and 32. When only the lower portion of tank 10 contains fuel, baffles 26 direct liquid fuel from end compartments 36 and 38 through pipe 40 to its lateral opening 42 and assure that liquid fuel is discharged adjacent inlet sock 44. In one construction, a 12 inch diameter tank was provided with a one-half inch diameter pipe located about 1.87 inch to the rear of the tank longitudinal axis; the pipe had a 0.375 inch diameter lateral hole.

A filler pipe 48 has a corrugated neck 50 extending through one end wall 22 and an inner extension 52 extending through opening 30 in one baffle 26. Filler pipe 48 terminates at a discharge end 54 adjacent the vehicle center line. Discharge end 54 is supported by a bracket 56 and is beveled to permit easy insertion into tank 10 and bracket 56. A vent tube 57 is secured in filler pipe 48. A filler cap 58 closes filler pipe 48.

Figure 3:
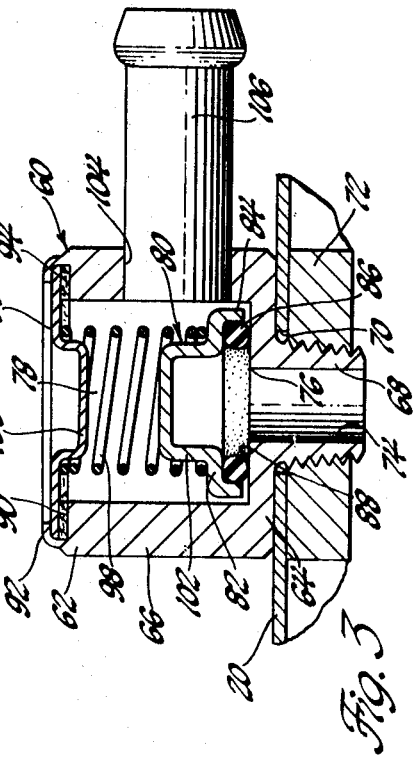
FIG. 3 is a sectional view taken along line 3—3 of FIG. 1 illustrating the construction of the pressure relief valve.

A pressure relief valve 60 is inserted through an opening in housing 20 in the uppermost portion of tank 10 adjacent the vehicle centerline. As shown in FIG. 3, valve 60 has a cupped body 62 including an end wall 64 defining the base of body 62 and a cylindrical wall 66 defining the side of body 62. A threaded fitting 68 extends downwardly from end wall 64 through an opening 70 in tank housing 20 and is received by a plug 72 welded within tank 10. A passage 74 extends through fitting 68 to an opening 76 in end wall 64 to define a path for fluid flow from tank 10 to the interior 78 of valve body 62.

A stamped sheet metal valve member 80 is disposed within body 62 and includes an annular portion 82 extending parallel to end wall 64 and a peripheral lip 84 surrounding annular portion 82 and extending toward end wall 64. An O-ring 86 is disposed between annular portion 82 and a smooth planar surface 88 formed on end wall 64 about opening 76. O-ring 86 is held against radial displacement by lip 84 and is bonded to and thus carried by valve member 80.

The upper end of cylindrical wall 66 defines an annular gasket receiving surface 90 and has a peripheral lip 92 surrounding surface 90. A gasket 94 overlies surface 90, and a stamped sheet metal cover 96 closes the upper end of body 62. Lip 92 is crimped over cover 96 so that gasket 94 seals the upper end of body 62.

A helically coiled spring 98 is disposed between cover 96 and annular portion 82 of valve member 80 and biases O-ring 86 into engagement with surface 88. Central cylindrical projections 100 and 102 on cover 96 and valve member 80, respectively, extend within and support spring 98.

Spring 98 is selected to maintain O-ring 86 in sealing engagement with surface 88 at tank pressures up to about 10 p.s.i. At tank pressures in the range of 10 p.s.i. to 12 p.s.i., the pressure in tank 10 raises valve member 80 and lifts O-ring 86 away from surface 88. Thus tank pressures in excess of the 10 p.s.i. to 12 p.s.i. range are relieved through passage 74, opening 76, body interior 78, an opening 104 in cylindrical wall 66, and a fitting 106 secured in opening 104. A hose may be connected to fitting 106 to route any vapor discharge to a desirable location.

From the foregoing, it will be appreciated that this invention provides an easily constructed pressure relief valve which retains the contents of a fuel tank under a predetermined pressure and which relieves any pressure in the tank in excess of the predetermined pressure.

I claim:

1. A pressure relief valve disposed on the top of a pressurized fuel tank comprising a cup-shaped body having an end wall forming the base of said body and a cylindrical wall extending upwardly from said end wall forming the side of said body, said body having a fitting extending downwardly from said end wall and threadedly received by said tank, said body having a passage extending through said fitting and an opening in said end wall which define a fluid flow path from said tank to the interior of said body, said end wall defining a smooth planar surface surrounding said opening and facing the interior of said body, a stamped sheet metal valve member disposed within said body, said member including an annular portion extending parallel to said surface and a peripheral lip extending downwardly from said annular portion toward said surface about the perimeter of said annular portion, an O-ring carried by said valve member underlying said annular portion of said valve member and radially supported by said peripheral lip, said valve member having a central cylindrical projection extending upwardly from said annular portion and defining a support for a helically coiled spring, a helically coiled spring surrounding said projection and seating on said annular portion of said valve member to bias said valve member and said O-ring toward said end wall and cause said O-ring to sealingly engage said smooth surface, said body having an annular gasket receiving surface on the upper end of said cylindrical wall and a peripheral lip extending upwardly from said gasket receiving surface about the perimeter of said gasket receiving surface, an annular gasket overlying said gasket receiving surface, a stamped sheet metal cover overlying said gasket and closing said body, said body peripheral lip being crimped over said cover to retain said cover in place, said cover having a central cylindrical projection extending downwardly toward said valve member within said spring and defining a support for said spring, said cylindrical wall having a lateral opening therethrough, and a discharge fitting secured in said opening leading from the interior of said body, said spring maintaining said O-ring in sealing engagement with said smooth surface at pressures in said fuel tank up to about 10 p.s.i., said spring permitting pressures in said fuel tank in the range of about 10 p.s.i. to about 12 p.s.i. to raise said valve member and lift said O-ring away from said smooth surface whereby pressure in said fuel tank in excess of the 10 p.s.i. to 12 p.s.i. range is relieved through said passage, said opening, the interior of said body, said lateral opening, and said discharge fitting.